US012512688B2

(12) United States Patent
Howlett, III et al.

(10) Patent No.: US 12,512,688 B2
(45) Date of Patent: Dec. 30, 2025

(54) SYSTEMS AND METHODS FOR CONTROLLED BATTERY HEATING SOURCING CURRENT TO AND FROM THE BATTERY AND DISCHARGE SIGNAL CONDITIONING FROM THE SAME

(71) Applicant: Iontra Inc, Centennial, CO (US)

(72) Inventors: John Richard Howlett, III, Centennial, CO (US); Daniel A. Konopka, Denver, CO (US); David Kessner, Denver, CO (US); William E. Check, Denver, CO (US)

(73) Assignee: Iontra Inc, Centennial, CO (US)

( * ) Notice: Subject to any disclaimer, the term of this patent is extended or adjusted under 35 U.S.C. 154(b) by 696 days.

(21) Appl. No.: 17/699,016

(22) Filed: Mar. 18, 2022

(65) Prior Publication Data

US 2022/0302728 A1    Sep. 22, 2022

Related U.S. Application Data

(60) Provisional application No. 63/313,147, filed on Feb. 23, 2022, provisional application No. 63/163,011, filed on Mar. 18, 2021.

(51) Int. Cl.
*H02J 7/00* (2006.01)
*G01R 31/389* (2019.01)
(Continued)

(52) U.S. Cl.
CPC ........ *H02J 7/00711* (2020.01); *G01R 31/389* (2019.01); *H01M 10/4264* (2013.01);
(Continued)

(58) Field of Classification Search
CPC .. H02J 7/00711; H02J 7/00032; H02J 7/0063; H02J 7/007194; H02J 7/345;
(Continued)

(56) References Cited

U.S. PATENT DOCUMENTS

| 6,072,301 A | 6/2000 | Ashtiani et al. |
| 2008/0286614 A1 | 11/2008 | Pearson |

(Continued)

FOREIGN PATENT DOCUMENTS

| JP | 2019129555 A | 8/2019 | |
| WO | WO-2009035611 A2 * | 3/2009 | ............ H01M 10/44 |
| WO | 2019230157 A1 | 12/2019 | |

OTHER PUBLICATIONS

International Searching Authority, International Search Report and Written Opinion, issued in connection with International Application No. PCT/US2022/021040, mailed Jul. 12, 2022 (10 pages).

(Continued)

*Primary Examiner* — David V Henze-Gongola
(74) *Attorney, Agent, or Firm* — Derek D. Donahoe; Polsinelli PC

(57) ABSTRACT

A system for heating a battery comprising a first switch operably coupled with a power supply. An inductive element, which may be a part of filter, is in operable communication with the first switch and a second switch. The system includes a processor in communication with the switches to execute instructions to control the switches to controllably source current to and from the battery, wherein the sources current to and from the battery may be of arbitrary shapes tuned to harmonics optimized for heat generation.

26 Claims, 9 Drawing Sheets

(51) Int. Cl.
  *H01M 10/42* (2006.01)
  *H01M 10/44* (2006.01)
  *H01M 10/46* (2006.01)
  *H01M 10/48* (2006.01)
  *H01M 10/615* (2014.01)
  *H01M 10/637* (2014.01)
  *H02J 7/34* (2006.01)

(52) U.S. Cl.
  CPC ......... *H01M 10/443* (2013.01); *H01M 10/46* (2013.01); *H01M 10/486* (2013.01); *H01M 10/615* (2015.04); *H01M 10/637* (2015.04); *H02J 7/00032* (2020.01); *H02J 7/0063* (2013.01); *H02J 7/007194* (2020.01); *H02J 7/345* (2013.01); *H01M 2010/4271* (2013.01); *H02J 2207/20* (2020.01)

(58) Field of Classification Search
  CPC .............. H02J 2207/20; G01R 31/389; H01M 10/4264; H01M 10/443; H01M 10/46; H01M 10/486; H01M 10/615; H01M 10/637; H01M 2010/4271
  See application file for complete search history.

(56) References Cited

U.S. PATENT DOCUMENTS

| | | | |
|---|---|---|---|
| 2012/0021263 A1 | 1/2012 | Nishi et al. | |
| 2012/0025779 A1 | 2/2012 | Xu et al. | |
| 2012/0025783 A1* | 2/2012 | Xu | H02J 7/342 320/129 |
| 2012/0099618 A1* | 4/2012 | Nishi | G01K 7/42 374/152 |
| 2014/0067323 A1 | 3/2014 | Skelton | |
| 2014/0285135 A1 | 9/2014 | Ji et al. | |
| 2015/0142237 A1* | 5/2015 | Wu | B60L 1/003 701/22 |
| 2018/0016697 A1* | 1/2018 | Konopka | H01M 10/44 |
| 2019/0207394 A1 | 7/2019 | Troxel et al. | |
| 2020/0176999 A1 | 6/2020 | Rastegar et al. | |
| 2020/0282863 A1 | 9/2020 | David et al. | |
| 2021/0307113 A1* | 9/2021 | Rastegar | H01M 10/637 |

OTHER PUBLICATIONS

International Search Report and Written Opinion mailed Jul. 20, 2023 in International Patent Application No. PCT/US2023/013745, 13 pages.

C. A. Felipe, et al. "Analytical Methodology to Design Third-Order Filter (LCL) for Battery Chargers," 2020 IEEE International Conference on Industrial Technology (ICIT), Buenos Aires, Argentina, 2020, pp. 444-449, doi: 10.1109/ICIT45562.2020.9067120.

* cited by examiner

SYSTEMS AND METHODS FOR CONTROLLED BATTERY HEATING SOURCING CURRENT TO AND FROM THE BATTERY AND DISCHARGE SIGNAL CONDITIONING FROM THE SAME

CROSS-REFERENCE TO RELATED APPLICATIONS

This application is related to and claims priority under 35 U.S.C. § 119 to U.S. Provisional Application No. 63/163,011 filed Mar. 18, 2021 entitled "POWERING A LOAD FROM A BATTERY DISCHARGING WITH HARMONIC COMPONENTS" and to U.S. Provisional Application No. 63/313,147 filed Feb. 23, 2022 entitled "SYSTEMS AND METHODS FOR CONTROLLED BATTERY HEATING SOURCING CURRENT TO AND FROM THE BATTERY," both of which are fully incorporated by reference herein for all purposes.

TECHNICAL FIELD

Embodiments of the present invention generally relate to systems and methods for heating and charging or discharging a battery, and more specifically for the controlled coordination of current to and from a battery to optimally heat a battery without damaging the battery, and conditioning unconventional discharge signals from a battery to power a load, among other things.

Background and Introduction

Countless different types of electrically powered devices, such as power tools, mobile computing and communication devices, portable electronic devices, and electrically powered vehicles of all sorts including scooters and bicycles, use rechargeable batteries as a source of operating power. Rechargeable batteries are limited by finite battery capacity and must be recharged upon depletion. Recharging a battery may be inconvenient as the powered device must often be stationary during the time required for recharging the battery. Depending on battery size, recharging can take hours. Moreover, battery charging is often accompanied by degradation of battery performance. As such, significant effort has been put into developing battery charging technology to reduce the time needed to recharge the battery, improve battery performance, reduce degradation of the battery from charging, among other things.

Various battery types including lithium-based batteries often cannot be charged at low temperatures without damaging the cell. In some cases, particularly in liquid electrolyte batteries, the electrolyte may freeze. Attempting to charge when the electrolyte is frozen or otherwise when the battery temperature is below certain thresholds, can damage the battery through electrode plating. This can obviously be a concern in many use cases where a battery is discharged but is at a temperature that is too low for conventional charging to take place.

It is with these observations in mind, among others, that various aspects of the present disclosure were conceived and developed.

SUMMARY

One aspect of the present disclosure involves a system for heating a battery comprising a processor in communication with a circuit where the processor is configured to execute instructions to heat a battery by controlling the circuit to alternate between sourcing current to the battery and sinking current from the battery, and the combination of sourcing current to the battery and sinking current from the battery heats the battery.

Another aspect of the present disclosure involves a battery powered system comprising a battery and a processor in operable communication with a charging circuit of the battery, the processor operably coupled to the charging circuit to control at least one harmonic component of a discharge signal from the battery. The system further may include a signal conditioning element positioned between the battery and a load system, the signal conditioning element receiving the discharge signal from the battery and providing a DC signal to the load system.

Another aspect of the present disclosure involves a method of charging a battery comprising, responsive to obtaining information indicative of whether the battery may be charged, alternating between sourcing current to the battery and sinking current from the battery to heat the battery. The method may further comprise receiving a temperature measurement of the battery providing the information indicative of whether the battery may be charged. In one possible example, obtaining a response from the battery based on application of a signal with a known harmonic provides the information indicative of whether the battery may be charged. In another possible example, the response is an impedance response and the information is a battery temperature correlation to the impedance response.

Another aspect of the present disclosure involves a method of charging a battery comprising, responsive to obtaining information indicative of whether the battery may accept charge, applying a harmonically tuned signal to the battery, where the harmonically tuned signal is composed of at least one harmonic associated with a conductance response and a reactance response to heat the battery. The method may further involve receiving a temperature measurement of the battery providing the information indicative of whether the battery may be charged. Another example may involve obtaining a response from the battery based on application of a signal with a known harmonic providing the information indicative of whether the battery may be charged. In one example, the response is an impedance response and the information is a battery temperature correlation to the impedance response. The at least one harmonic may be a higher frequency than a kinetic and a diffusive process of the battery. If the signal is composed of multiple harmonics, then the collection of harmonics may be higher frequencies than the kinetic and diffusive processes of the battery.

These and other features of the present disclosure are discussed in greater detail below.

BRIEF DESCRIPTION OF THE DRAWINGS

The various objects, features, and advantages of the present disclosure set forth herein will be apparent from the following description of embodiments of those inventive concepts, as illustrated in the accompanying drawings. It should be noted that the drawings are not necessarily to scale or include every detail and may be representative of various features of an embodiment, the emphasis being placed on illustrating the principles and other aspects of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
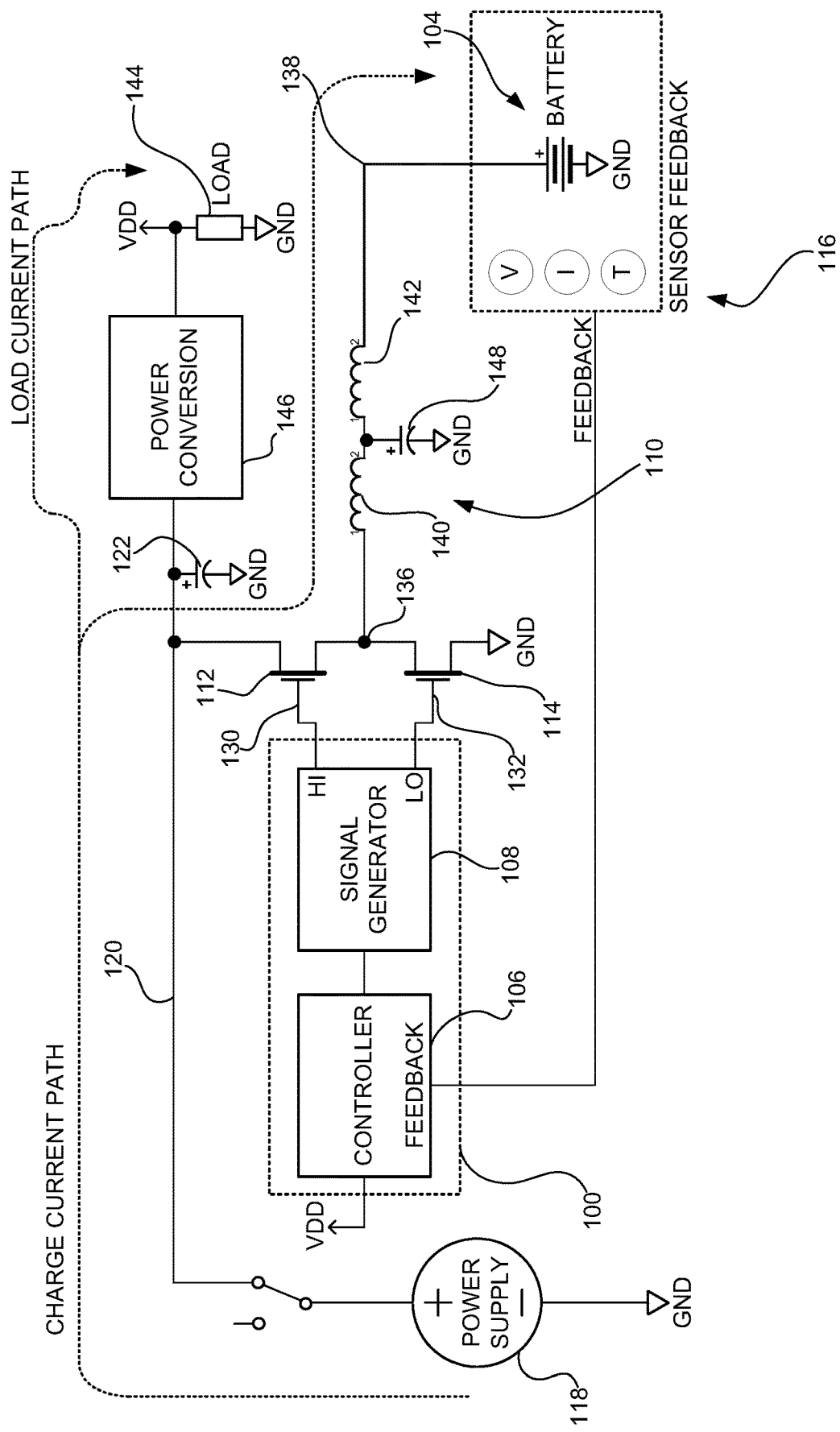
FIG. 1 is a circuit diagram of a battery heating and charging system in accordance with one embodiment, the diagram further illustrating a charging path and a load path from a power supply.

Systems, circuits, and methods are disclosed herein for heating and charging (recharging) a battery. The terms charging and recharging are used synonymously herein. Aspects of the present disclosure may provide several advantages, alone or in combination, relative to conventional charging. For example, the charging techniques described herein may allow for heating a battery to sufficient level for charging to take place. In some cases, the battery temperature is monitored, and when below a threshold, the system initiates a heating sequence before charging, and transitions to a charging sequence when the battery is sufficiently warmed. The temperature thresholds may be tailored to various battery chemistries. In one example, temperature thresholds for heating, combinations of heating and charging, and charging may depend or be related to freezing temperature of a liquid electrolyte, although various possible temperature parameter and threshold are contemplated. Moreover, some battery chemistries such as those in solid state batteries do not have a liquid electrolyte but are nonetheless affected by temperature such that charging at too low a temperature may damage the battery. The system may also involve circuit elements that allow for charging techniques that reduce the rate at which an anode is damaged, can control heat generated by the battery either by generating heat or minimizing heat generation above certain levels when charging has commenced, which may have several follow-on effects such as reducing electrode and other battery damage, reducing fire or short circuit risks, and the like.

When discharging a battery whether for heating or to power a load, aspects of the present disclosure further involve a discharge signal conditioning element positioned between the battery and the load or integrated within the load. Conventionally, batteries are discharged to a load with a DC signal. However, aspects of the present disclosure involve, whether heating or otherwise, an unconventional non-DC discharge signal. The discharge signal conditioning element serves to condition the unconventional discharge signal suitable for the load or element powering the load using the energy from the battery.

In one example, the various embodiments discussed herein charge a battery by generating a charge or discharge signal that is controllably shaped. The shapes may be tuned based on impedance effects of the battery to various harmonics. In some instances, during heating, the shape, which may include harmonic aspects, in charge or discharge, is tailored to heat the battery and minimize damage to the battery or to achieve other effects. In some instances, during charging, the shape or content of the charge signal, which may also include harmonic aspects, is optimized for charge. During heating, the system may select harmonic attributes associated with relatively higher impedance as compared to charging where the system may control the charge signal to include harmonic attributes associated with relatively lower impedance.

The system may further use a model of one or more components of a charge/discharge signal shaping circuit. Conventional charge techniques like constant current or constant voltage do not involve charge signal shaping and hence control is relatively straightforward, and there is no need for the charge and discharge signal shaping techniques discussed herein. The model may be used to confirm and/or adjust the controls for generating the signal to or from the battery, and likely a combination during heating. In some instances, aspects of the shape and/or content of the charge signal may correspond to a harmonic (or harmonics) associated with an optimal transfer of energy to the battery, although the purpose of the system is to be able to efficiently generate any arbitrarily shaped charging signal and apply the same to the battery, among other goals. In other instances, particularly around battery heating, which may occur prior to charging, involves shaping and/or defining a signal intended to cause heating and minimize or eliminate charging. The shape or signal content, which may be any arbitrary shape defined by the controls and, in some instances includes defined harmonic content, is nonetheless controlled.

In one possible implementation, a feed-forward technique of utilizing a model to determine the control signals for defining a charge/discharge signal may provide several advantages including accuracy and speed of signal adjustment. Moreover, the arrangement may be operable with fewer components than other approaches thereby reducing costs, using less printed circuit board real estate, among other advantages. The approach further, whether using the model or not, may include adjustment of the signal from one of heating to charging when an appropriate temperature of the battery is reached, followed by signal adjustments as the battery is charged.

Aspects of the system, whether using a model or not, may further include feedback of temperature and other battery parameters both during the heating phase as well as transitioning to and through the charging phase. Feedback, alone or in conjunction with a model, may allow the system to adjust for component drift, adjust for effects of temperature or other effects on circuit components, adjust for changes in the battery, and periodically provide additional data to the system and/or the model to alter its output, among other things. Moreover, the system may use battery temperature to select between heating or charging, and to, in some instances, transition between a heating phase to a phase where charging is optimized without heating, which may include a transition phase of both heating and charging.

The term "battery" in the art and herein can be used in various ways and may refer to an individual cell having an anode and cathode separated by an electrolyte, solid or liquid, as well as a collection of such cells connected in various arrangements. A battery or battery cell is a form of electrochemical device. Batteries generally comprise repeating units of sources of a countercharge and electrode layers separated by an ionically conductive barrier, often a liquid or polymer membrane saturated with an electrolyte. These layers are made to be thin so multiple units can occupy the volume of a battery, increasing the available power of the battery with each stacked unit. Although many examples are discussed herein as applicable to a battery, it should be appreciated that the systems and methods described may apply to many different type of batteries ranging from an individual cell to batteries involving different possible interconnections of cells such as cells coupled in parallel, series, and parallel and series. For example, the systems and methods discussed herein may apply to a battery pack comprising numerous cells arranged to provide a defined pack voltage, output current, and/or capacity. Moreover, the implementations discussed herein may apply to different types of electrochemical devices such as various different types of lithium batteries including but not limited to lithium-metal and lithium-ion batteries, lead-acid batteries, various types of nickel batteries, and solid-state batteries, to name a few. The various implementations discussed herein may also apply to different structural battery arrangements such as button or "coin" type batteries, cylindrical cells, pouch cells, and prismatic cells.

Figure 2:
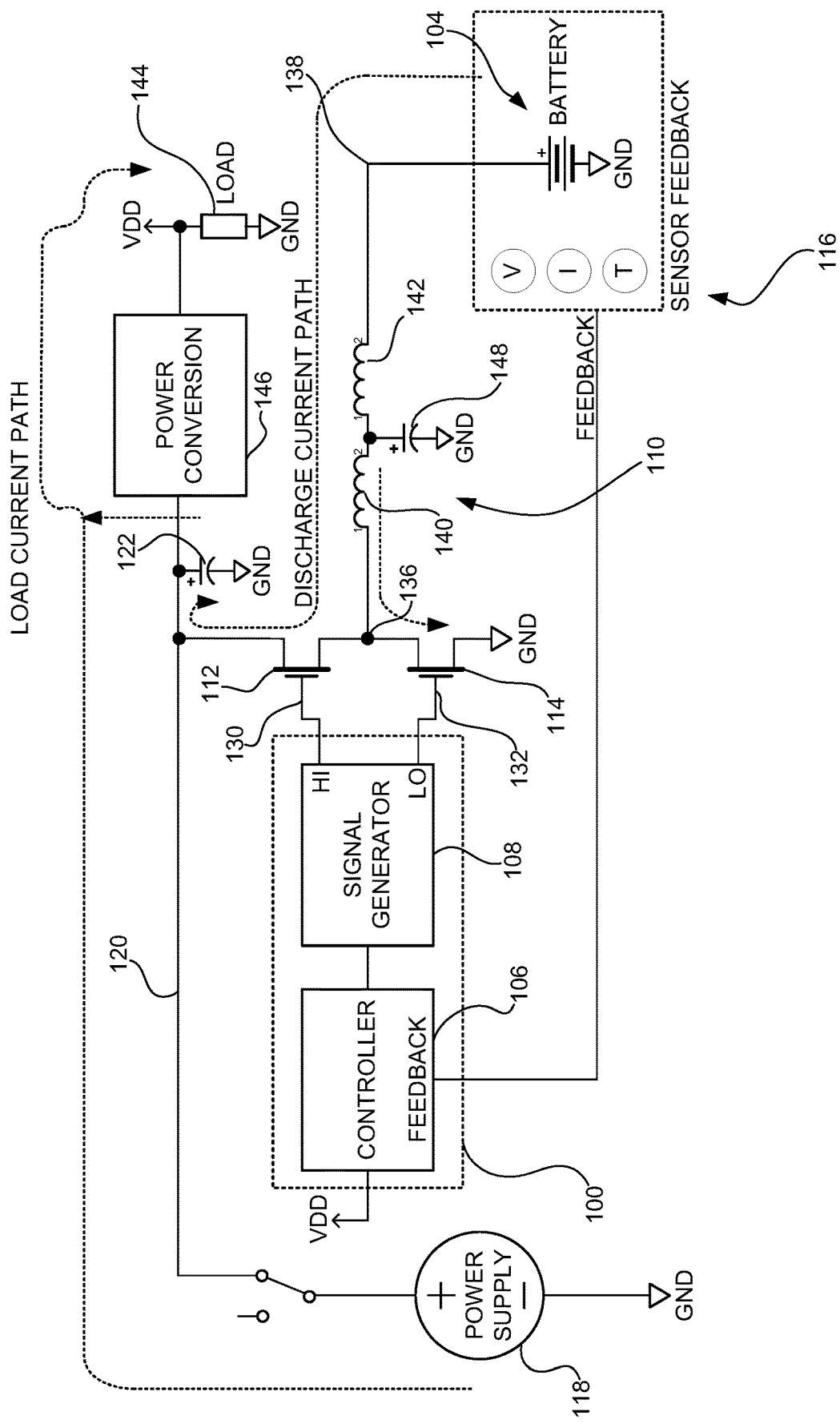
FIG. 2 is a circuit diagram of the battery heating and charging system of FIG. 1, the diagram further illustrating a discharge path from the battery in conjunction with a load path from a power rail including a power supply.
Figure 3:
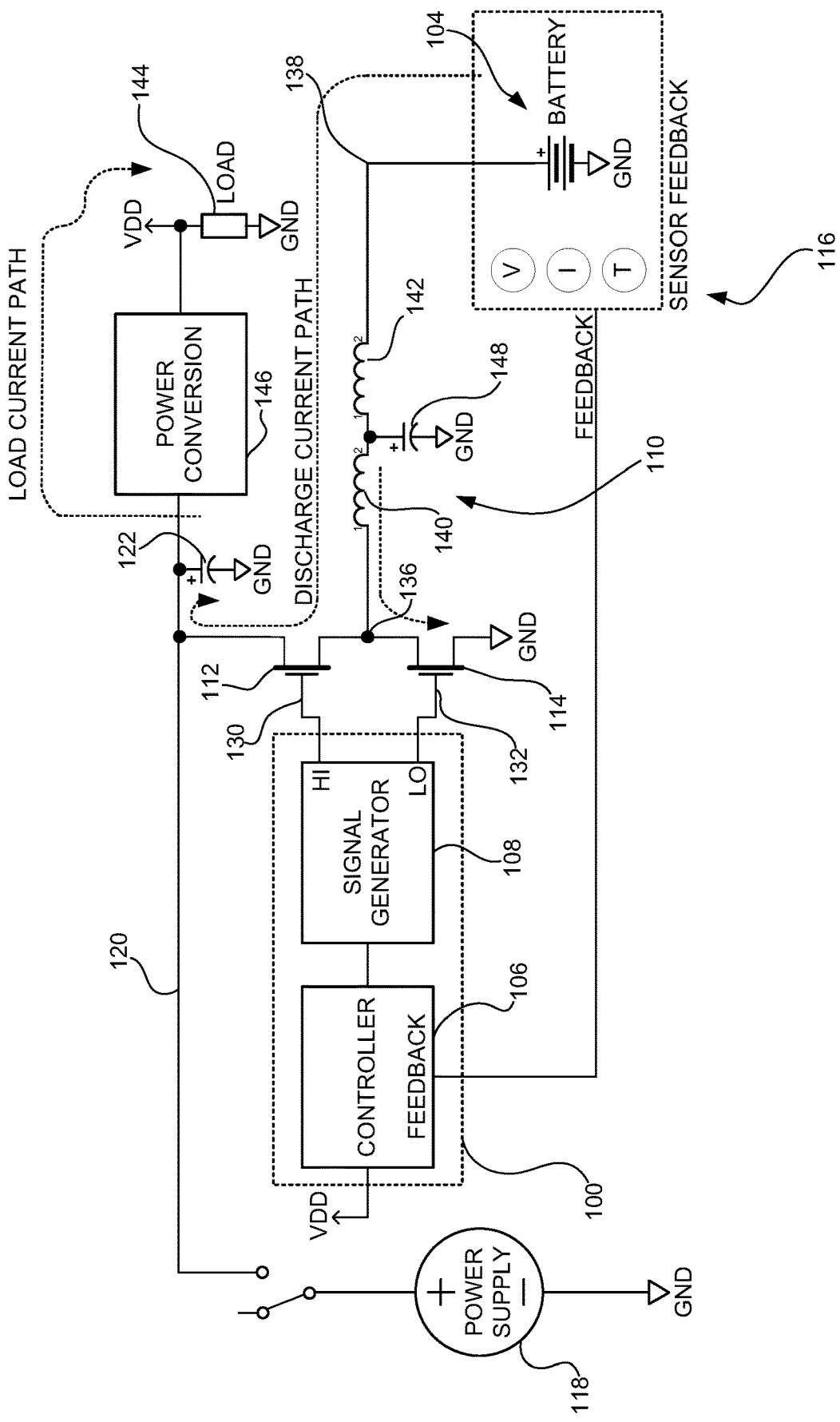
FIG. 3 is a circuit diagram of the battery heating and charging system of FIGS. 1 and 2, the diagram further illustrating a charging path and a load path from the power rail (e.g., a capacitor thereon) with the power supply not sourcing energy (e.g., current).

FIGS. 1 through 3 illustrate a battery heating and charging circuit topology in accordance with one embodiment of the present disclosure. Arrows illustrated in the figures define current flow paths during different operational states of the system. In FIG. 1, the system is shown in a configuration sourcing current (charging) to the battery and powering a load. In FIG. 2, the system is shown in a configuration drawing current from the battery (discharging or sinking), a discharge path to a capacitor on the rail and powering a load with the power supply on (connected to the rail). In FIG. 3, the system is shown in a configuration drawing current from the battery to a capacitor on the rail along with powering a load with the power supply off (not connected to the rail). In both FIGS. 2 and 3, there is also an arrow showing the "blip" path to the lower, second transistor, which blipping initiates the discharge current path.

FIG. 1, as well as FIGS. 2 and 3, are schematic diagrams illustrating an example charge signal generator arrangement 100 for heating, charging and/or discharging a battery 104. The generator includes a processing unit or more generally a control unit 106 that may include a controller, such as a microcontroller, FPGA (field-programmable gate array), ASIC (application-specific integrated circuit), microprocessor, combinations thereof, or other processing arrangement, which may be in communication with a signal generator 108 that produces controls for generating a charge signal from a charge signal shaping circuit 110. The controller may be in communication with a model, which may be part of the generator, to produce the control instructions to the charge signal shaping circuit. The control unit, including the controller and a model if present, may be an integrated unit. The system may also receive feedback including battery measurements from a battery measurement unit 116, such as current and/or voltage measurements at battery terminals of the battery 104 in the presence of a signal (heat, charge and/or discharge), and those battery measurements may be used to obtain impedance measurements and/or affect heating or charge control. In general, the generator may also include or be operably coupled with a power source 118, which may be a voltage source or a current source. In one embodiment, the power source 118 is a direct current (DC) current or voltage source, although alternating current (AC) sources are also contemplated. In various alternatives, the power source 118 may include a DC source providing a unidirectional current, an AC source providing a bidirectional current, or a power source providing a ripple current (such as an AC signal with a DC bias to cause the current to be unidirectional. In general, the power source 118 supplies the charge energy, e.g., current, that may be shaped or otherwise defined by the control unit 106 and circuit 110 to produce a controllably shaped charge signal to heat, charge and/or discharge the battery 104. In one example, a controller 106 may provide one or more inputs to the signal generator 108, which controls switches to generate pulses to the circuit 110, which may also be referred to as a filter, which produces the shaped signal at the battery.

In some instances, the signal shaping circuit 110 may alter energy from the power source 118 to generate a signal that is shaped based on conditions at the battery 104, such as a signal that at least partially corresponds to a harmonic or harmonics based on the impedance when a signal comprising the harmonic or attributes of the harmonic is applied to the battery 104. In the example of FIG. 1 and otherwise, the circuit 100 may include the battery measurement unit 116 connected to the battery 104 to measure cell voltage and/or charge current, as well as other battery attributes like temperature and measure, calculate or otherwise obtain the impedance the battery 104 based on the same. In one example, battery characteristics may be measured based on the signal to or from the battery. In another example, battery cell characteristics may be measured as part of a routine that applies a signal with varying frequency attributes to generate a range of battery cell characteristic values associated with the different frequency attributes to characterize the battery, which may be done prior to heating, charging or discharging, during charging, periodically during the same, and may be used in combination with look-up techniques, and other techniques. The battery characteristics may vary based on many physical of chemical features of the battery, including a state of charge and/or a temperature of the battery. As such, the battery measurement circuit 116 may be controlled by the controller 106 to determine various battery characteristic values of the battery 104 during heating, recharging of the battery, and/or powering a load among other times, and provide the measured battery characteristic values to the controller 106 or other parts of the generator 100.

During charge, the controller 106 may generate an intended charge signal for efficient charging of the battery 104. For example, a determined impedance of the battery 104 or signal definitions characterized from understanding impedance effects of signals on a battery may be used by the controller 106 to generate or select a charge signal with attributes that correspond to a harmonic associated with an optimal impedance, which may be a range of impedances, for energy transfer, which optimal impedance may be associated with a minimum impedance value of the battery 104. As such, the controller 106 may execute a charge signal algorithm that outputs a charge signal shape based on measured, characterized and/or estimated charging conditions of the battery 104. Generally speaking, the signal generator controls the switches to generate a sequence of pulses at node 136, which are converted by circuit 110 to the charge signal shape. Similarly, during heating, the battery may be characterized, based on temperature, to understand impedance effects of a charge or discharge signal on the battery and a signal controlled based on the same. Here, the node 136 may similarly be controlled but such that current with defined impedance attributes is both sourced to and sunk from the battery by way of the circuit 110. It should be recognized that heating may also involve transitioning from current into and out of the battery, characterized in a way, that optimizes heating, minimizes or eliminates plating, and minimizes any energy storage in the battery during the heating sequence. The signal generator 108 may generate one or more control signals based on the heat or charge signal algorithm and provide those control signals to the signal shaping unit 110. The control signals may, among other functions, shape or otherwise define the signal to and from the battery to approximate the shaped charge signal determined, selected or otherwise obtained by the controller 106. The charge signal shaping circuit 110 may further filter any unwanted frequency attributes from the signal. In some instances, the shaped charge signal may be any arbitrarily shaped signal, such that the signal whether heating, charging or discharging, is not a constant DC signal and does not conform to a conventional repeating charge signal, such as a repeating square wave or triangle wave charge signal.

The circuits of FIGS. 1-3 include switching elements 112, 114, which may be considered part of circuit 110, to generate an initial sequence of controlled pulses at node 136, which are then converted into a shaped signal by filter 110, to produce a signal that is applied to or from the battery, in accordance with one embodiment. The switching elements may also be used to generate a discharge signal from the battery by similarly generated pulses at node 136, without the presence of charge current on the rail 120.

As introduced, the circuit 100 may include one or more components to shape a signal that intentionally causes battery heating through a coordinated combination of charge and discharge at the battery 104. The circuit 100 may include a first switching element, e.g., transistor 112, and a second switching element, e.g., transistor 114, with the first switching element connected to the power rail and thereby connected to the power supply 118 during charge and coupled to a capacitor 122 on the rail during discharge. The capacitor may have various functions including discharge signal conditioning as discussed in more detail below. The first transistor 112 may receive an input signal, such as pulse-width modulation (PWM) control signal 130, to operate the first transistor 112 as a switching device or component. In general, the first transistor 112 may be any type transistor, e.g., a FET or more particularly a MOSFET, a GaN FET, Silicon Carbide based FETs, or any type of controllable switching element. For example, the first transistor 112 may be a FET with a drain node connected to a first inductor 140, a source connected to the rail and a gate receiving the control signal 130 from the signal generator 110. In various embodiments, the circuit 110 also includes the inductor 140 but may also have various other possible inductive elements. The circuit 110, and particularly the combination of inductors 142, 140 and capacitor 148, when operating in a bi-directional fashion for both charge and discharge and as described in more detail below, may be considered a boost topology when controlling current from the battery during a discharge portion of heating or more generally during sinking current to a load during normal operation.

When heating, the system may be operated to both source current to the battery (generally referred to as charging but recognizing that during heating, the system optimizes source current to heat rather than charge) as well as sink current from the battery (discharging, similarly recognizing that during heating, the system optimizes current from the battery to heat rather than powering a load). The system may control the heating sequence to transition quickly from sourcing current to the battery and sinking current from the battery. For sourcing current (charging), the control signal 130 may be provided by the circuit controller 106 to control the operation of the first transistor 112 as a switch that, when closed, connects the first inductor 140 to the rail 120 such that a current from the power supply (and/or sourced from capacitor 122) flows through the first inductor 140, as well as a second inductor 142 if present, to the battery. The second transistor 114 may receive a second input signal 132 and may also be connected to the drain of the first transistor 112 at node 136. In a charge situation and in some instances, the second input signal 132 may be a PWM signal opposite of the first control signal 130 to the first transistor 112 such that switching is coordinated with one on while the other is off.

The inductor value or values, the capacitor value or values, the time and frequency of actuating the transistors, and other factors can be tailored to generate a waveform and particularly a waveform with controlled harmonics to the battery for heating the same. With reference to the example signals illustrated in FIGS. 4-6, the signal at node 136 when sourcing current may be a series of pulses between 0 volts and the about the rail voltage. The pulses at node 136 may be of varying duty cycle and may be generated at varying frequency. Overall, however, the pulses are generated to produce a signal that is the same or nearly the same as the intended current signal to or from the battery. So, for example, a signal like any of those in FIGS. 4-6 would be at node 138 based on the combination of pulses present at node 136, which are then shaped into the signal at 138 by the filter arrangement 110. Depending on the signal, 10s to 1000s (or more) pulses may be generated to form the desired charge signal.

A discharge sequence involves having the upper, first transistor 112, initially off and turning on the bottom, second transistor 114. The second transistor may be blipped on for only enough time to initiate current flow from the battery to the inductors 142, 140. The transistor may be controlled to eliminate or minimize current flow to ground through the second inductor. When current (discharge) from the battery is initiated, the second transistor is turned off and the upper transistor 112 is turned on, with either the power supply off or on, to drive current to the rail capacitor 122 and/or to a load 144. Once current flow is initiated from the battery, pulses may be controlled at node 136 to similarly shape the discharge signal or discharge portion of the signals. Depending on the type of power required by the load, the system may include some form of power conversion 146. The system may work with the power supply on or off. If off, current is directed to the capacitor and/or the load. If on, the power supply may include functionality that will coordinate the power supply to maintain rail voltage and if the discharge to the current increases the rail voltage above some level, it may synchronize the power supply to maintain the set rail voltage.

Overall, the system may be controlled, during heating, to quickly transition between sourcing and sinking energy to and from the battery. Moreover, the circuit may be operated to shape the current to the battery and/or shape the current from the battery by controlling the pulses at node 136. Through these features, alone or in various combinations, the battery may be heated to a sufficient level for charging to occur. It should be recognized that various different battery types have different temperature thresholds for proper operation including charging or powering a load. Additionally, or separately, heating may occur with little or no charge to the battery with energy instead focused on heating, minimizing, or avoiding plating or other electrode damage, transitioning to charging and altering the signal to one of optimal charging and transitioning to not generating excess heat, optimal circuit efficiency using components having multi-functional roles of controlled heating and controlled charging, among other benefits.

As introduced, the system may include a first capacitor 122 connected between the power rail and ground. The capacitor may be used to store discharge energy which then may be used to power the load while on charge, alone or in conjunction with power from the power supply. As discussed in more detail below, the capacitor 122 may also serve to condition the discharge signal prior to it being further processed by the power conversion or directly powering the load. Additionally, some of the energy required for a charge waveform may be provided by a combination of the power supply and the capacitor 122. In some instances, discharge energy from the battery stored in the capacitor may be returned to the battery during heating and when the system is sourcing current to the battery. The circuit may also include a second capacitor 148 connected between the first inductor 140 and the second inductor 142 to ground. The second inductor 142 may be connected to the battery, e.g., an anode of the battery 104.

After heating and during charging or powering the load from the battery, the system may operate, in general, to prevent rapid changes to the signal applied to or from the battery 104. In charging operation, the filter may also convert the pulses at the input of the filter to a charge signal as well as filter any unintended high frequency noise from the battery. For example, upon closing of the first transistor 112 based on control signal 130, first inductor 140 and second inductor 142 may prevent a rapid increase in current transmitted to the battery 104. Moreover, the inductor 140 or inductors 140 and 142, alone or in combination with capacitor 148, may shape the waveform applied to the battery, and control of the signal applied to the inductor(s) may provide for controlled shaping of the waveform. These components may similarly be used to control the discharge waveform shape. In another example, capacitor 148 may store energy from the power supply while first transistor 112 is closed. Upon opening of the first transistor 112, which may be accompanied by closing transistor 114, the capacitor 148 may provide a small amount of current to the battery 104 through second inductor 142 to resist an immediate drop of current to the battery and may similarly be used to controllably shape the waveform applied to the battery, particularly avoiding sharp negative transitions during conventional charging after heating. The filter circuit also removes other unwanted signals such as noise which may include relatively high frequency noise.

It should be appreciated that more or fewer components may be included in the system. For example, one or more of the components of the filter circuit may be removed or altered as desired to filer or define the signals to and from the battery. Many other types of components and/or configurations of components may also be included or associated with the system.

Figure 4:
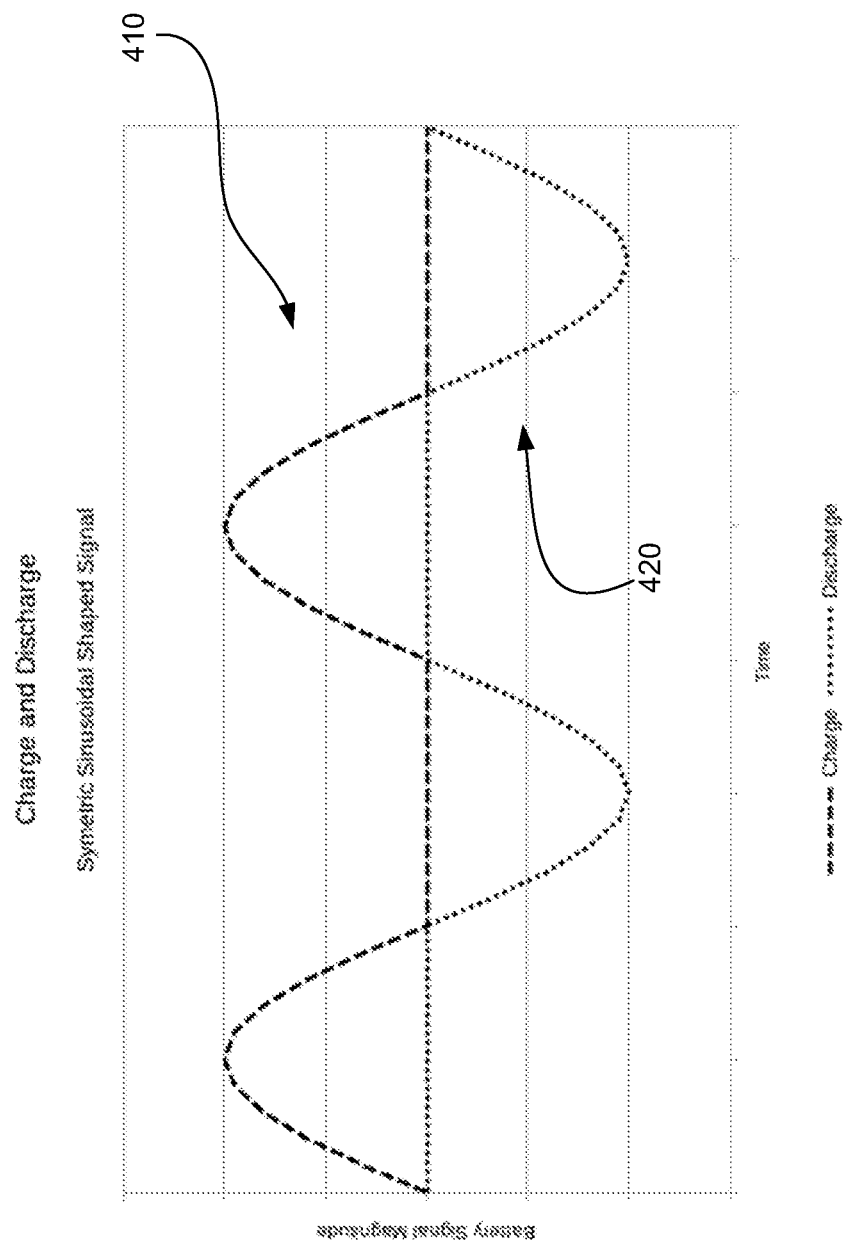
FIG. 4 is a signal diagram of a first example heating signal comprising a symmetrically shaped charge current portion and discharge current portion, in accordance with one embodiment.
Figure 5:
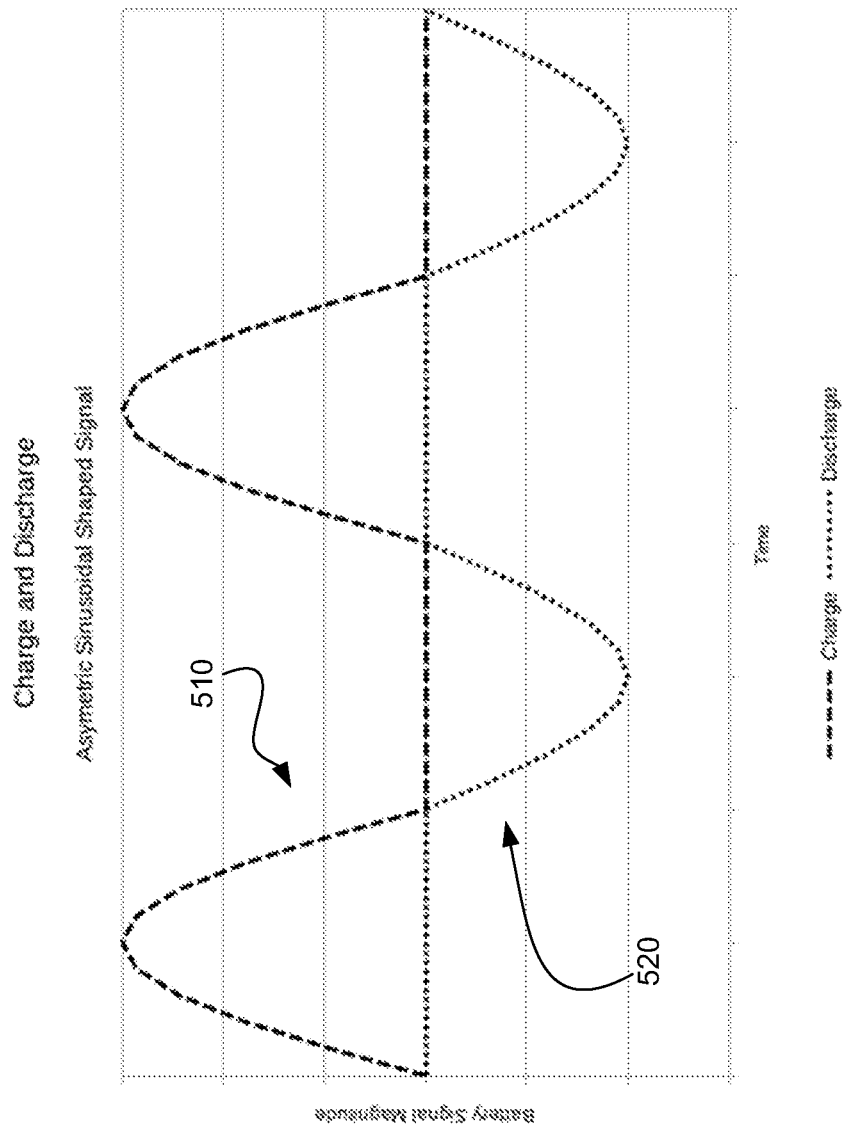
FIG. 5 is a signal diagram of a second example of a heating signal comprising an asymmetrically shaped charge current portion and discharge current portion, in accordance with one embodiment.
Figure 6:
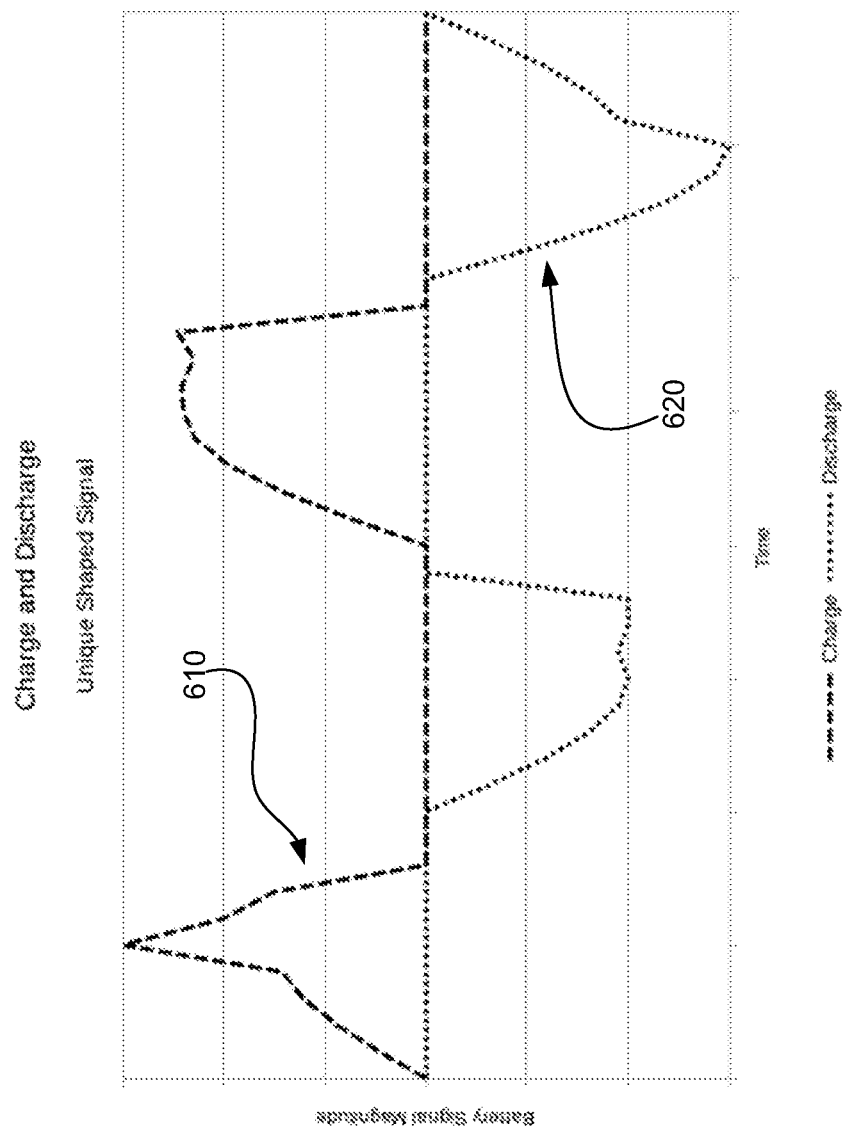
FIG. 6 is a signal diagram of a third example of a heating signal comprising differently shaped charge current portions and discharge current portions, in accordance with one embodiment.

FIGS. 4-6 illustrate alternative possible example heating waveforms. In each case, the controlled waveform transitions between a charge or sourcing portion 410 (510, 610) to a discharge or sinking portion 420 (520, 620). At a high level, the heating waveform of FIG. 4 appears as a sinusoid with the positive going portion of the waveform being a current into the battery (e.g., the current path to the battery of FIG. 1) and the negative going portion of the waveform being a current from the battery (e.g., the current path from the battery to the capacitor on the rail of FIG. 2 or 3, noting the current path to ground through the lower transistor is only meant to initiate the discharge current path to the rail capacitor). The shape of either the current to the battery or the current from the battery is controlled by pulses at node 136. Namely, by controlling the frequency, pulse width, and/or voltage level of the pulses, the system can shape the waveform to or from the battery.

The heating waveform of FIG. 5 is of an asymmetric sinusoid with the current to the battery (positive going portion of the waveform) having a greater absolute amplitude as compared to the current from the battery. In some instances, particularly in a fully or nearly fully discharged battery, it may be necessary to add slightly more energy than is discharged to avoid over-discharging the battery. The heating waveform of FIG. 6 has arbitrarily, albeit controlled, shapes of the current to the battery as compared to the current from the battery. Moreover, the shapes are not consistent from one arbitrarily shaped input current portion to the next arbitrarily shaped input current portion as well as from one arbitrarily shaped output current portion to the next output current portion.

The frequency of transition from source to sink, the signal shapes of sourcing versus sinking, and various other aspects of the heating sequence may be varied. The shape of any portion of the signals, whether to or from the battery, may be based on the impedance of the battery to the signal being applied to or from the battery. The signal definitions may be preset. The signal definitions may also be algorithmic depending on various battery parameters including SOC, temperature, number of cycles, battery chemistry and configuration and numerous other possible attributes. The signal definitions may also vary through the course of heating and charging. As noted herein, impedance and harmonics may affect the charge signal choice or definition. As a general notion, signal definitions associated with relatively higher impedance and associated harmonics may be selected for a heating sequence with relatively lower impedance and associated harmonics for a charging or discharging to power a load sequence. It should also be noted that the relatively rapid change between sourcing and sinking current to and from the battery may be used to heat, with the system transitioning away from sinking current (during charge) once a sufficient temperature is reached such that charging will not damage the battery.

In a heating sequence, it is possible to tailor one or more attributes of a charge and/or discharge portion of a signal to a relatively higher impedance characteristics as compared to a charging sequence where it may be optimal to tailor the charge signal to relatively lower impedance characteristics. By injecting current briefly into the cell followed by pulling current briefly from the cell, it is possible generate heat without initiating any substantial battery charging. The frequency of transition between current into and out of the battery may affect the optimal heating if the harmonics associated with the transition are relatively high such that energy is used primarily to heat. Additionally, or alternatively, the charge or discharge portion of the waveform may be defined to include harmonic attributes associated with a relatively high impedance. As such, current energy into the battery or out of the battery may be consumed primarily as heat due to the relatively higher impedance (resistance generally) as opposed to charging, charging a capacitor during discharge and/or powering a load during discharge.

Battery temperature may be assessed in various ways. In one example, the system may assess battery temperature using a temperature sensor at the battery. Various temperature sensors may be employed either in contact with the battery, in contact with a terminal of the battery, positioned in a housing containing the battery, or otherwise. Various sensor examples include thermistors, thermocouples, infrared sensors, diodes and transistors, or any of a myriad of different types of temperature sensors.

In another example, the batteries response of harmonics or other frequency attributes may be used to probe the internal temperature of the battery or more generally the ability of the battery to accept charge, which may be the same or slightly different than a measurement of temperature, particularly the external temperature of the battery. The use of harmonic response may also be used to more uniformly assess the capability of the battery to accept charge.

In one specific example, the system uses a characterization of the battery response to various harmonics at different temperatures. Any given battery type or specific battery may be characterized. The characterization may be stored in a look-up table accessible in memory by the processor, by setting thresholds, or the like. In this specific example, it is understood that various different battery chemistries and configurations have different impedance responses at different temperatures. Thus, for a given battery, the impedance response of signals with the specific harmonic frequencies applied to the battery differs based on temperature. In some instances, temperature probing signals of at different discrete frequencies may be used to generate an impedance response, which is then compared to the characterization to assess temperature or more generally the ability of the battery to accept charge, and thus whether or not heating is required before charge may be initiated. The impedance response may be characterized by the imaginary, real or both imaginary and real components of impedance. In some embodiments the impedance response may be used alone or in combination with a sensed measurement of the battery temperature to determine whether the battery should be heated or may be charged. Similarly, other frequency-based responses or impedance derived terms such as susceptance, admittance and capacitance may be used alone or in place of a direct sensed measurement of temperature to determine whether the system will be configured to heat the battery.

In general, in various embodiments where impedance values are being considered, the technique assesses harmonic values where the values, alone or in combination, are associated with some impedance. Given the generally inverse relationship, the term impedance as used herein may include its inverse admittance, including its constituents of conductance and susceptance alone or in combination.

In another aspect, battery heating may be achieved through controllably charging or discharging the battery, or a combination of the same as discussed above. In this example, the signal, whether or a charge signal, a discharge signal, or a signal alternating between charge (sourcing current to the battery) and discharge (sinking current from the battery), is composed of one or more harmonics tuned such that signal optimizes relatively high conductance and relatively high reactance in the battery. Using a charge signal as an example, the optimized combination (or balance) between high conductance and high reactance generates heat in the battery. In this example, the signal is composed of harmonics such that the harmonics may be identified in a frequency domain representation (or transform) or representations of the signal. The tuned signal may also be shaped to reflect various harmonic attributes. In a fairly simple example, the signal may also be composed of a discrete sinusoid at a specific frequency such that it both composed of the harmonic and shaped in the form of the harmonic. Generally speaking, even with very high conductance, if the reactance is too low then the magnitude of the signal may be higher than many charging environments can support in order to create sufficient heat. Similarly, if the conductance is too low, then even with high reactance, too large a conversion of energy into heat may be required. Hence, for any starting temperature and battery chemistry, the system selects a charge signal with harmonics that balances high conductance and high reactance.

In one specific example, a given form of battery may be characterized at various temperatures by assessing signals composed of various combinations of harmonics to identify a signal or signals that balance relatively high conductance and relatively high reactance to achieve sufficient heating. Characterization may also determine the time at which a heating signal is applied to reach a state sufficient to begin heating. The balance may further account for attributes that minimize energy used for actual charging, so the energy is instead focused on heating. The same technique may be applied to generating discharge signal harmonics, which may be the same or different as the charge signal at various temperatures.

The harmonic frequencies may typically be relatively higher frequencies than the kinetic and diffusive processes in any given battery that the signal is optimized to heat. Generally speaking, frequencies are selected that are faster than the kinetic response of the electrochemical processes so that the voltage and current magnitudes do not adversely impact the electrodes or interfaces of the battery when heating occurs. Thus, in heating, it would be possible to use a relatively higher voltage signal (e.g., 6V when normally a maximum of about 4V is specified) that would normally cause plating, but because the signal is composed of a harmonic or spectrum of harmonics that are faster than the kinetics, the relatively higher voltage will not cause plating. With that said, in many instances, a signal is chosen that falls within relatively lower specified charging (or discharging) voltage levels. Additionally, with the various heating techniques described herein, in some instances the system is optimized to heat without passing any net charge. In such instances, the system controls the signal to charge and discharge with relatively even total energies such that the signals cancel each other, accounting for any differences in energy conversion efficiency differences between the charge and discharge portion at any given temperature.

Figure 7:
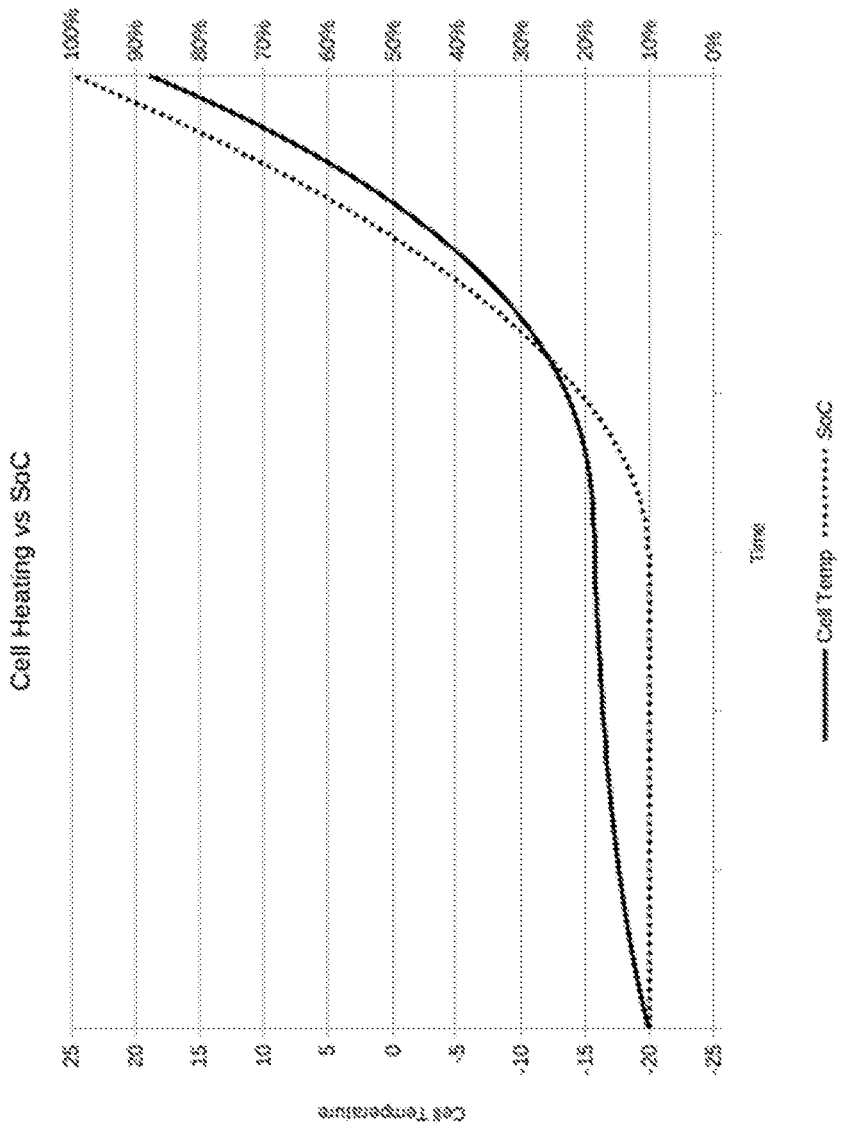
FIG. 7 is an example of a profile that heats the battery until the battery temperature will allow charging.

FIG. 7 is an example of a profile that heats the battery until the battery temperature will allow charging. In this example, the initial battery temperature is −20 C, at 10% SOC. The battery is heated until it reaches about −15 C, at which time this battery may begin charging. It can be seen that the SOC stays at about 10% as the battery is warmed about 5 C before charging commences. It can also be seen that the temperature of the battery continues to rise until it reaches 100% SOC.

In many conventional battery powered systems, the system relies on a DC discharge current from the battery to provide power to some load. The battery may be a single cell or small number of cells such as in a power tool, vacuum, portable speaker system or the like, or a large pack of interconnected cells such as may be found in an electric powered vehicle of some type. The arrangement and type of cells will typically depend, at least in part, on the specified capacity for the system in which the battery is operating, the required discharge currents for the load of the system and other factors. Regardless, conventional batteries provide a DC discharge current when powering a load. When an AC signal is required to drive a load, such as an AC motor, a converter, such as converter 146, is used to convert the DC output of the battery to the required AC signal for the load.

Figure 8:
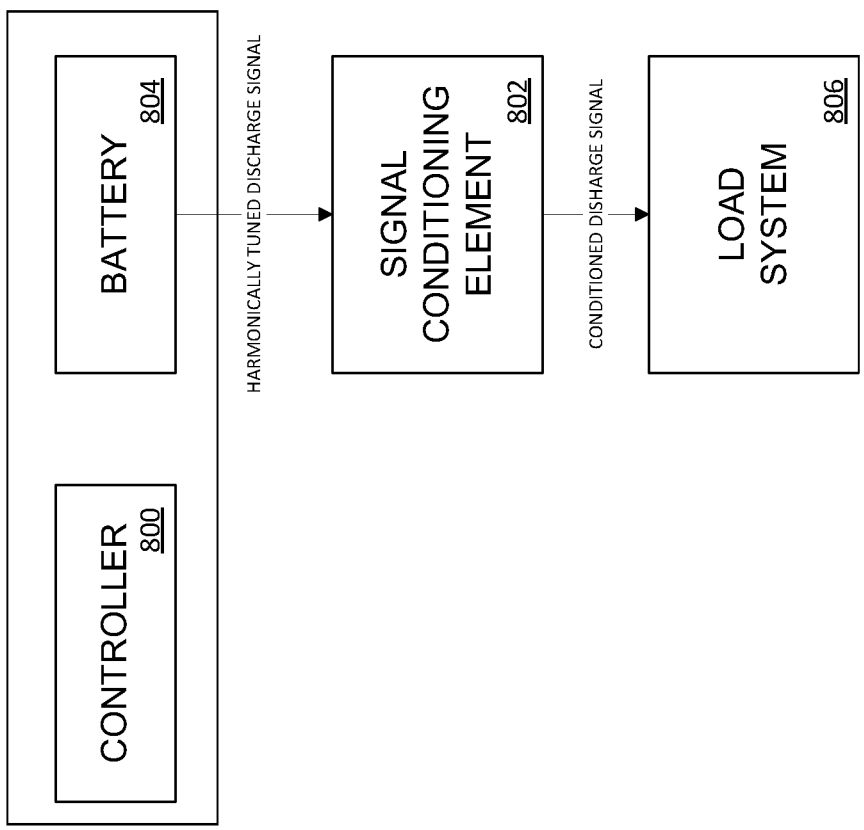
FIG. 8 is a system diagram including a signal conditioning element to covert an unconventional non-DC current from a battery to a signal for consumption by power conversion or otherwise a load that conventionally requires a DC signal.

According to various aspects of the present disclosure, systems may involve a controlled discharge signal, whether part of a heating sequence or to power a load, from the battery that includes various possible harmonics (e.g., harmonic components at specified frequencies or otherwise shaped discharge signal). Referring again to FIGS. 1-3, as well as FIG. 8, the system may include the battery 104 (804) and a controller 100 (800) that manages the discharge signal of the battery, alone or in combination with a charge signal when in the context of heating although discharge control may be used in general operation of the system being powered by the battery to optimally discharge the battery. The controller may be some form of processing unit and may be part of a control system separate from the battery or may be integrated with the battery as in a battery management system. Regardless of the control configuration, the overall system provides a discharge signal where one or more of a leading edge of the signal, other aspects of the edge of the signal, harmonics comprising the body of the signal, and/or a trailing edge of the signal may be tuned to specific frequencies attributable to reducing and/or minimizing impedance attributes of the battery in the presence of the discharge signal during operation of the system or otherwise tailored to initially heat the battery so it may transition to charging or otherwise powering the load, in various possible examples. Regardless, a harmonic component of the discharge signal is controlled or more generally the discharge signal has unconventional non-DC attributes. The harmonic component or components may be based on an assessment of complex impedance or otherwise the attributes of the battery in the presence of discharge harmonics, to select and control harmonic components of the discharge signal that reduce or otherwise minimize the impedance attributes (e.g., complex impedance) in the presence of the discharge signal when powering a load, or generate harmonics with relatively higher impedance such that energy is primarily consumed as heat when in a heating operational mode, or other harmonic attributes are controlled for various possible reasons. Controlling the discharge in these ways has several possible advantages to the battery including optimization of heat during discharge, enhancing battery life and capacity, increasing discharge current magnitude and other advantages relative to batteries of the same type being discharged using conventional techniques.

In such a harmonically controlled discharge signal environment, however, conventional downstream systems may likely not be suitable for receiving such discharge-controlled signals from the battery. Accordingly, in one example, a discharge signal conditioning element 802 is positioned between the battery 804 and the load 806 (144) or integrated within the load. The discharge signal conditioning element serves to condition the unconventional discharge signal suitable for the load or element powering the load using the energy from the battery. In one example, and referring to FIG. 1, the discharge signal conditioning element is a suitable capacitor 122 or capacitor bank, or other energy storage element, positioned to receive the discharge signal from the battery and store sufficient energy for the needs of the load. In an example, the load system 806 may also include a DC to AC converter or other form of power conversion 146 (FIG. 1) to power a load, and the capacitor or capacitor bank is positioned between the battery and the DC to AC converter component of the load system. The harmonically controlled discharge signals are then used to charge the capacitor bank, and the capacitor bank provides the DC source required by the DC to AC converter or the load directly. The capacitor bank is sized and arranged according to the power demands of the load.

In another example, the load is configured to receive the harmonically tuned discharge signal from the battery. For a DC driven load, for example and similar to the embodiment discussed above, the load may include the capacitor 122 at the input to the load that removes the harmonic content from the discharge signal. In other examples, the discharge signal may be controlled by a buck or boost circuit that drives the load. In such an example, the buck or boost circuit may be controlled to tailor the harmonic content of the discharge signal and at the same time tune the discharge signal to the load. While the signal conditioning element and the load system are shown as separate blocks, signal conditioning may be integrated with the load system.

Figure 9:
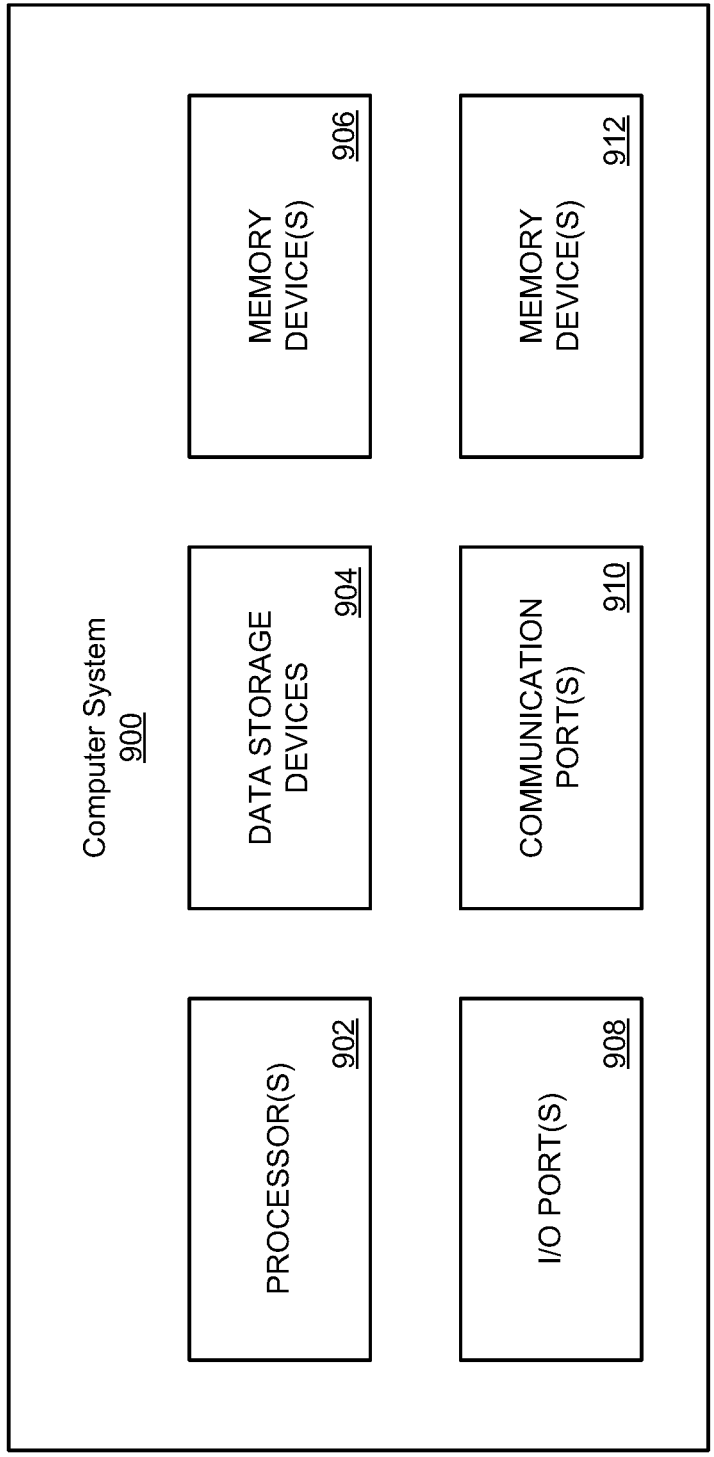
FIG. 9 is a diagram illustrating an example of a computing system which may be used in implementing embodiments of the present disclosure.

Referring to FIG. 9, a detailed description of an example computing system 900 having one or more computing units that may implement various systems and methods discussed herein is provided. The computing system 900 may be part of a controller, may be in operable communication with various implementation discussed herein, may run various operations related to the method discussed herein, may run offline to process various data for characterizing a battery, and may be part of overall systems discussed herein. The computing system 900 may process various signals discussed herein and/or may provide various signals discussed herein. For example, battery measurement information may be provided to such a computing system 900. The computing system 900 may also be applicable to, for example, the controller, the model, the tuning/shaping circuits discussed with respect to the various figures and may be used to implement the various methods described herein. It will be appreciated that specific implementations of these devices may be of differing possible specific computing architectures, not all of which are specifically discussed herein but will be understood by those of ordinary skill in the art. It will further be appreciated that the computer system may be considered and/or include an ASIC, FPGA, microcontroller, or other computing arrangement. In such various possible implementations, more or fewer components discussed below may be included, interconnections and other changes made, as will be understood by those of ordinary skill in the art.

The computer system 900 may be a computing system that is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 906, and/or one or more ports 908-912. Additionally, other elements that will be recognized by those skilled in the art may be included in the computing system 900 but are not explicitly depicted in FIG. 9 or discussed further herein. Various elements of the computer system 900 may communicate with one another by way of one or more communication buses, point-to-point communication paths, or other communication means not explicitly depicted in FIG. 9. Similarly, in various implementations, various elements disclosed in the system may or not be included in any given implementation.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The presently described technology in various possible combinations may be implemented, at least in part, in software stored on the data stored device(s) 904, stored on the memory device(s) 906, and/or communicated via one or more of the ports 908-912, thereby transforming the computer system 900 in FIG. 9 to a special purpose machine for implementing the operations described herein.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908, a communication port 910, and a sub-systems port 912, for communicating with other computing, network, or vehicle devices. It will be appreciated that the ports 908-912 may be combined or separate and that more or fewer ports may be included in the computer system 900. The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. In some examples, such inputs may be distinct from the various system and method discussed with regard to the preceding figures. Similarly, the output devices may convert electrical signals received from computing system 900 via the I/O port 908 into signals that may be sensed or used by the various methods and system discussed herein. The input device may be an alphanumeric input device, including alphanumeric and other keys for communicating information and/or command selections to the processor 902 via the I/O port 908.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as battery voltage, open circuit battery voltage, charge current, battery temperature, light, sound, temperature, pressure, magnetic field, electric field, chemical properties, and/or the like.

In one implementation, a communication port 910 may be connected to a network by way of which the computer system 900 may receive network data useful in executing the methods and systems set out herein as well as transmitting information and network configuration changes determined thereby. For example, charging protocols may be updated, battery measurement or calculation data shared with external system, and the like. The communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate with one or more other machines, either directly over a point-to-point communication path, over a wide area network (WAN) (e.g., the Internet), over a local area network (LAN), over a cellular (e.g., third generation (3G), fourth generation (4G), fifth generation (5G)) network, or over another communication means.

The computer system 900 may include a sub-systems port 912 for communicating with one or more systems related to a device being charged according to the methods and system described herein to control an operation of the same and/or exchange information between the computer system 900 and one or more sub-systems of the device. Examples of such sub-systems of a vehicle, include, without limitation, motor controllers and systems, battery control systems, and others.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments, also referred to as implementations or examples, described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment", or similarly "in one example" or "in one instance", in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

What is claimed:

1. A system for heating a battery comprising:
a circuit; and
a processor in communication with the circuit, the processor configured to execute instructions to heat a battery by controlling the circuit to alternate between producing a charge signal sourcing current to the battery from a power source and producing a discharge signal sinking current from the battery, the combination of sourcing current to the battery and sinking current from the battery heating the battery, wherein the discharge signal from the battery is composed of at least one harmonic corresponding to a conductance response and a reactance response to heat the battery.

2. The system of claim 1 wherein the circuit comprises a first switch and a first inductive element coupled with the first switch; and
the processor controlling the first switch to pulse to the first inductive element to generate the alternation between sourcing current to the battery and sinking current from the battery.

3. The system of claim 2, the processor further configured to generate a sequence of pulses at the first inductive element to produce a shaped current waveform to the battery as the charge signal, the first inductive element involved in producing the shaped current waveform sourcing current to the battery.

4. The system of claim 2, the processor further configured to generate a sequence of pulses at the first inductive element to produce a shaped current waveform from the battery as the discharge signal, the first inductive element involved in producing the shaped current waveform sinking current from the battery.

5. The system of claim 1 wherein the processor comprises a microcontroller.

6. The system of claim 1 wherein the first switch is in communication with a second switch at a common node, the common node operably coupled with the inductive element.

7. The system of claim 6 wherein the first switch is a first transistor and the second switch is a second transistor.

8. The system of claim 1 wherein the first inductive element is a first inductor.

9. The system of claim 8 further comprising a second inductor coupled with the first inductor, and a battery operably coupled with the second inductor, and a capacitor coupled between the first inductor and the second inductor.

10. The system of claim 2 further comprising a power supply coupled with a rail, the rail coupled with the first switch, a load coupled with the rail and a capacitor on the rail.

11. The system of claim 10 wherein the current sourced from the battery is stored in the capacitor on the rail.

12. The system of claim 11 wherein the capacitor further sources current through the first switch to the battery.

13. The system of claim 1 wherein the processor is further configured to transition from a heating sequence to a charging sequence based on battery temperature measurements.

14. A battery powered system comprising:
a charging circuit;
a battery operably coupled with the charging circuit;
a processor operably coupled with the charging circuit to control at least one harmonic component of a discharge signal from the battery corresponding to a conductance response and a reactance response to heat the battery; and
a signal conditioning element positioned between the battery and a load system, the signal conditioning element receiving the discharge signal from the battery and providing a DC signal to the load system.

15. The battery powered system of claim 14 wherein the load system comprises a DC to AC converter.

16. The battery powered system of claim 15 wherein the signal conditioning element comprises a capacitor.

17. The battery powered system of claim 14 wherein the charging circuit comprises:
a first switch operably coupled with a second switch;
a first inductive element coupled between the first switch and the second switch; and
a processor in communication with the first switch and in communication with the second switch, the processor configured to execute instructions to heat a battery by controlling the first switch to source current to the battery by way of the first inductive element and to control the second switch and the first switch to source current from the battery to the signal conditioning element, the combination of sourcing current to the battery and from the battery heating the battery.

18. A method of charging a battery comprising:
responsive to obtaining information indicative of whether the battery may be charged, alternating between sourcing current to the battery from a power source and sinking current from the battery to heat the battery by a harmonically tuned signal composed of at least one harmonic corresponding to a conductance response and a reactance response to heat the battery.

19. The method of charging a battery of claim 18 further comprising receiving a temperature measurement of the battery providing the information indicative of whether the battery may be charged.

20. The method of charging a battery of claim 18 further comprising obtaining a response from the battery based on application of a signal with a known harmonic providing the information indicative of whether the battery may be charged.

21. The method of claim 20 wherein the response is an impedance response and the information is a battery temperature correlation to the impedance response.

22. A method of charging a battery comprising:
responsive to obtaining information indicative of whether the battery may accept charge, applying a harmonically tuned signal to the battery, the harmonically tuned signal composed of at least one harmonic corresponding to a conductance response and a reactance response to heat the battery.

23. The method of charging a battery of claim 22 further comprising receiving a temperature measurement of the battery providing the information indicative of whether the battery may be charged.

24. The method of charging a battery of claim 22 further comprising obtaining a response from the battery based on application of a signal with a known harmonic providing the information indicative of whether the battery may be charged.

25. The method of claim 24 wherein the response is an impedance response and the information is a battery temperature correlation to the impedance response.

26. The method of claim 22 wherein the at least one harmonic is a higher frequency than a kinetic and a diffusive process of the battery.

* * * * *